Feb. 10, 1953     J. H. WADDELL     2,627,780
OPTICAL PROJECTING COMPARATOR
Filed June 10, 1950     6 Sheets-Sheet 1
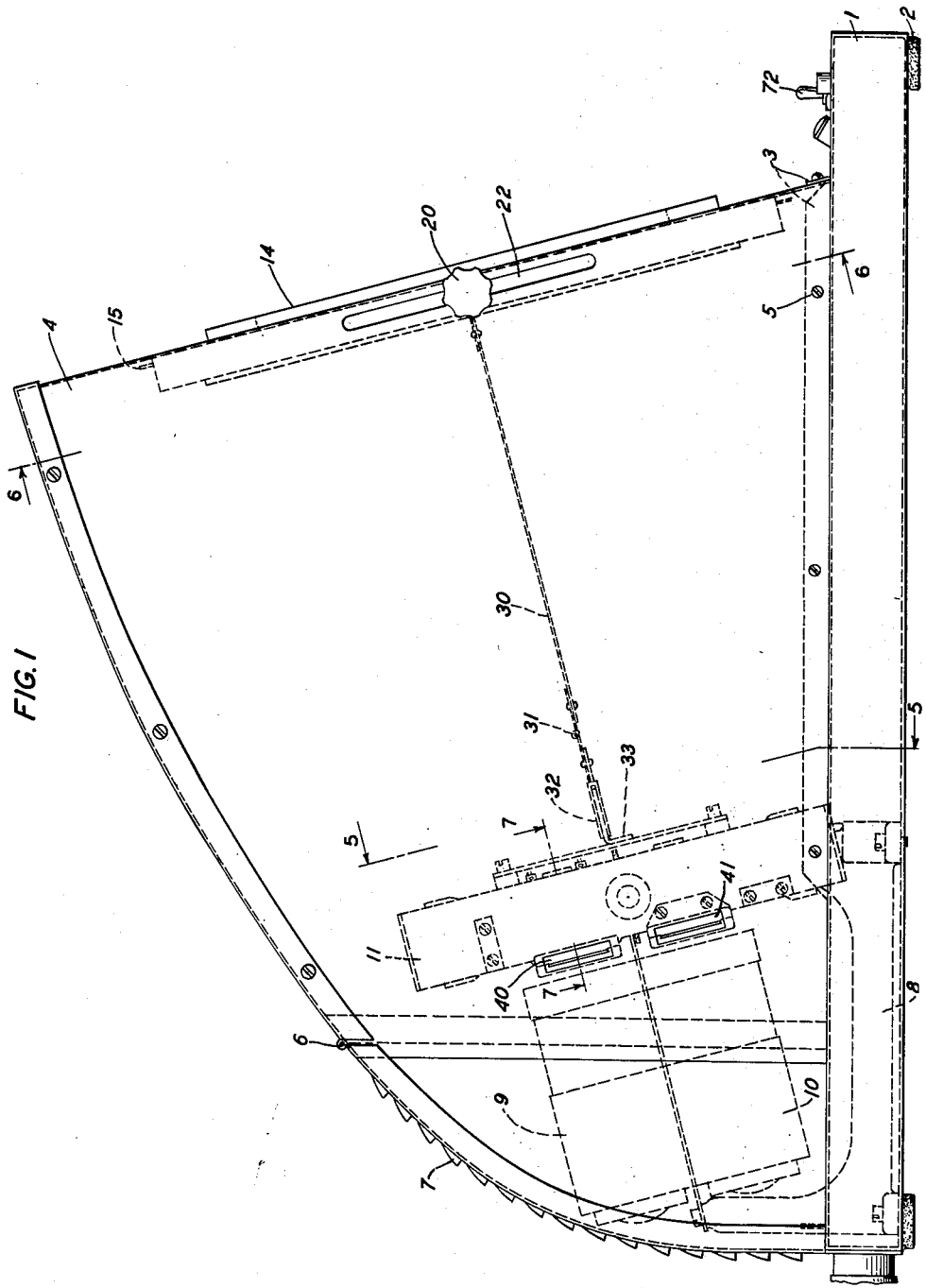
FIG. I
INVENTOR
J. H. WADDELL
BY
J. F. McEneany
ATTORNEY

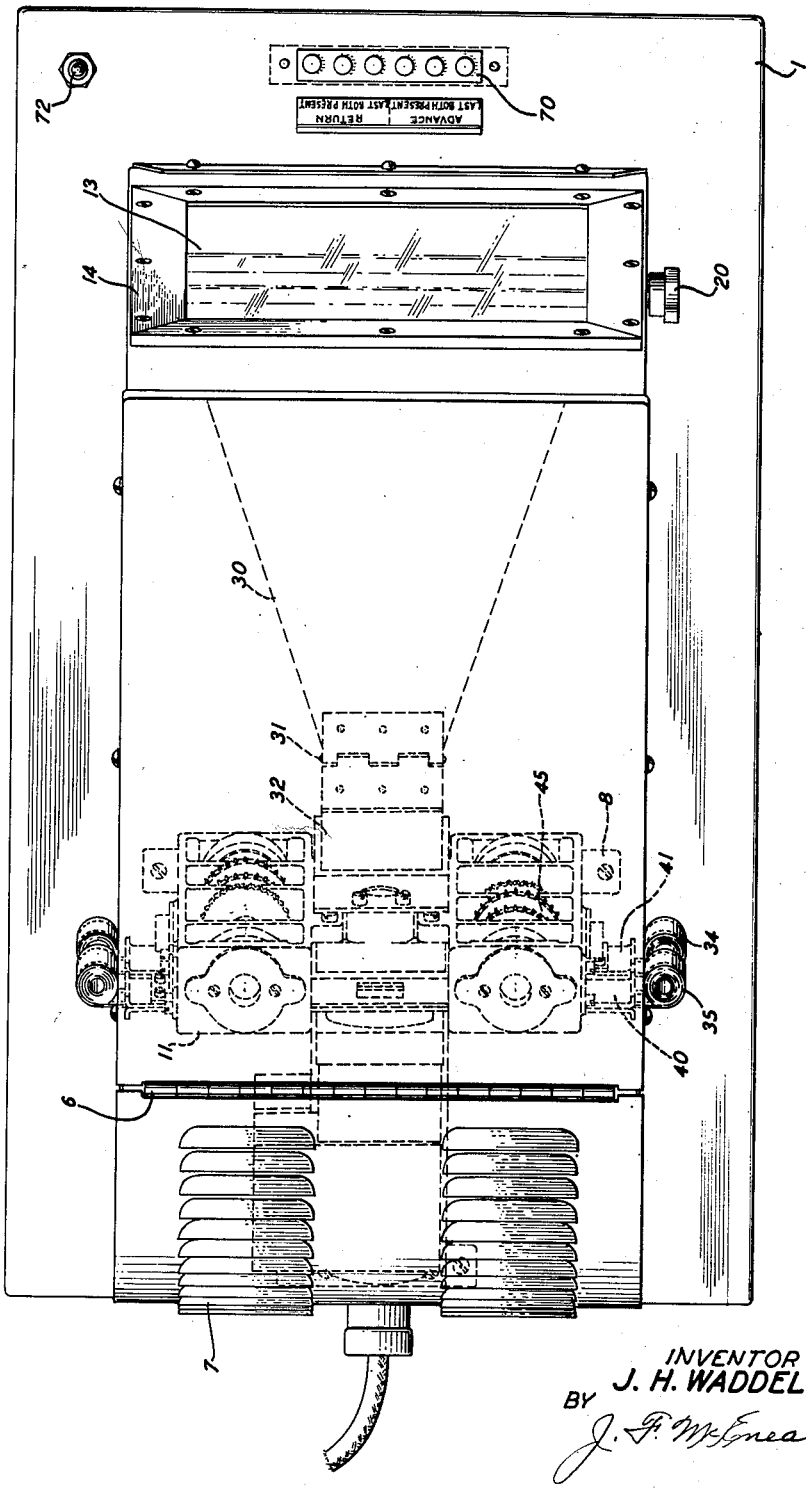

Feb. 10, 1953 J. H. WADDELL 2,627,780
OPTICAL PROJECTING COMPARATOR
Filed June 10, 1950 6 Sheets-Sheet 3
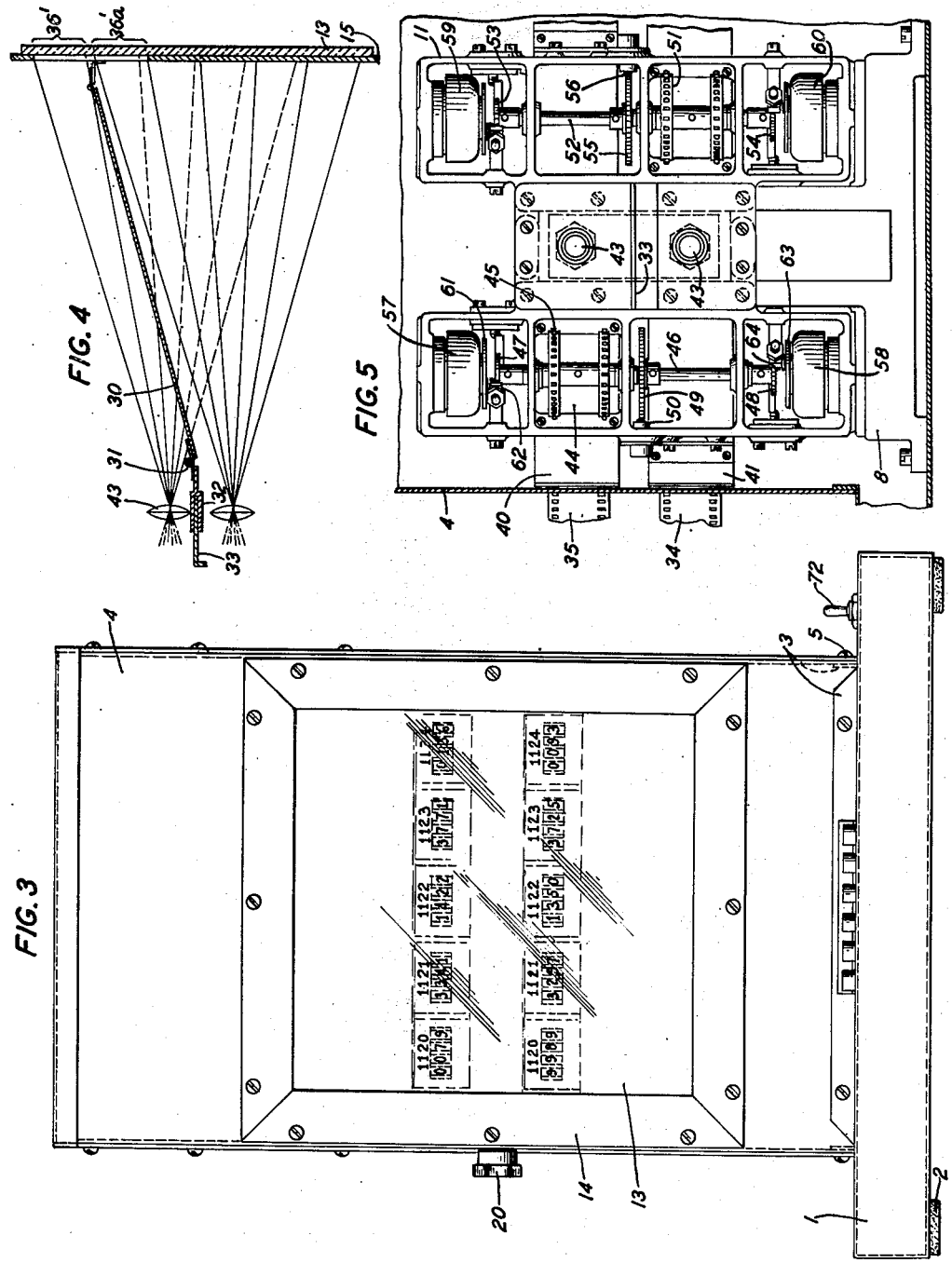
INVENTOR
J. H. WADDELL
BY
J. F. McEneany
ATTORNEY Feb. 10, 1953
J. H. WADDELL
2,627,780
OPTICAL PROJECTING COMPARATOR
Filed June 10, 1950
6 Sheets-Sheet 4
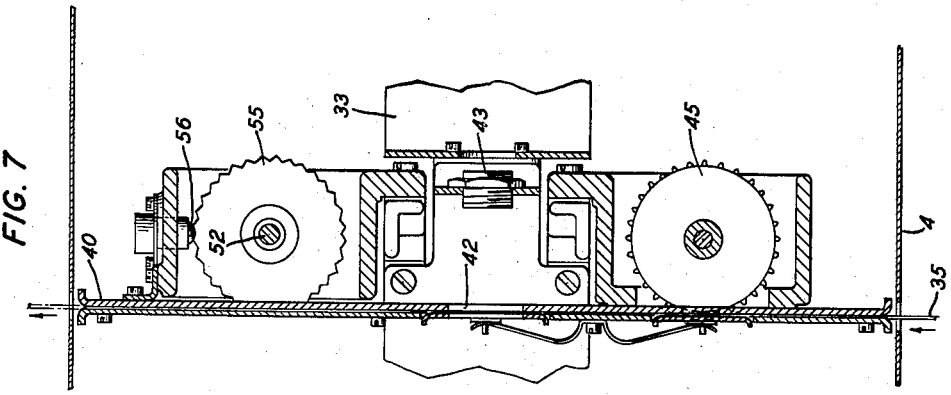
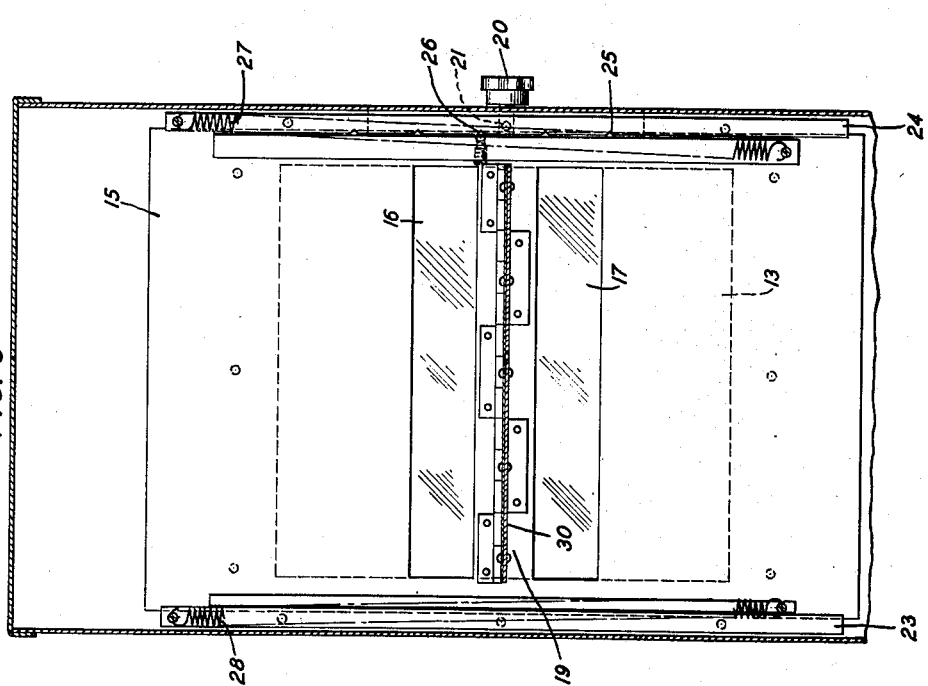
INVENTOR
BY J. H. WADDELL
ATTORNEY Feb. 10, 1953

J. H. WADDELL 2,627,780

OPTICAL PROJECTING COMPARATOR

Filed June 10, 1950

INVENTOR
J. H. WADDELL
BY
J. F. McEneany
ATTORNEY

Feb. 10, 1953 — J. H. WADDELL — 2,627,780
OPTICAL PROJECTING COMPARATOR
Filed June 10, 1950 — 6 Sheets-Sheet 6
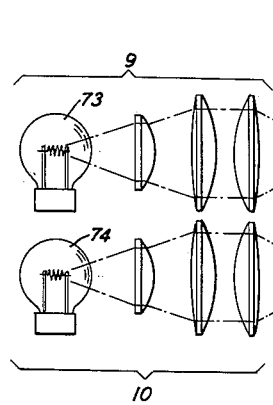
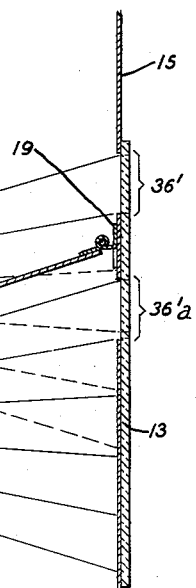
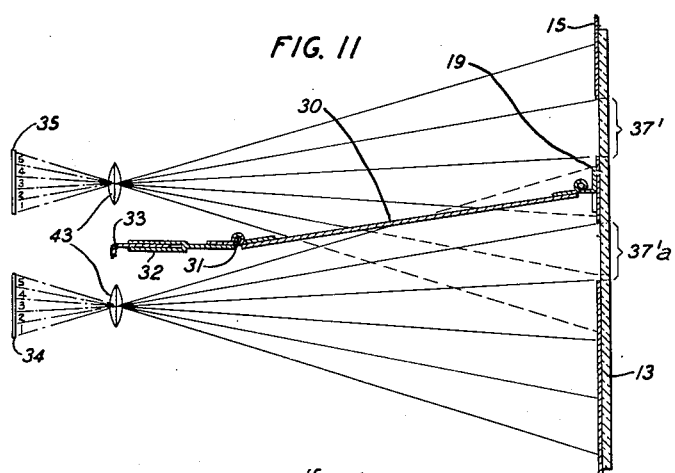
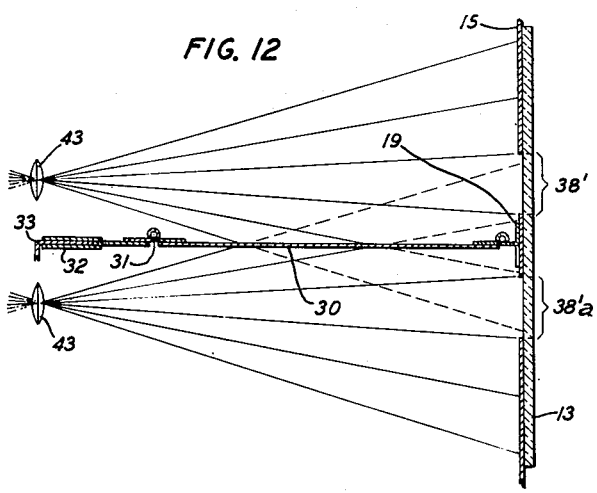
INVENTOR
J. H. WADDELL
BY
J. F. McEneany
ATTORNEY Patented Feb. 10, 1953

2,627,780

UNITED STATES PATENT OFFICE 2,627,780

OPTICAL PROJECTING COMPARATOR

John H. Waddell, North Plainfield, N. J., assignor to Bell Telephone Laboratories, Incorporated, New York, N. Y., a corporation of New York Application June 10, 1950, Serial No. 167,387

8 Claims. (Cl. 88—24)

This invention relates to improvements in projecting apparatus permitting visual comparison of enlarged images of related objects.

It is the object of this invention to provide means for optically comparing corresponding elemental areas of two photographic records.

More specifically, it is the object of this invention to provide means for projecting a pair of photographic records taken at different times of a plurality of rows of registers to permit successive comparison of the corresponding rows of registers in juxtaposition on a viewing screen.

In one type of telephone service, the number of messages completed by each subscriber is recorded by an individual message register in each subscriber's line. These message registers are usually mounted in banks on an equipment frame in the central office. Periodically, photographic records are made of these message registers. Normally five rows of five message registers are recorded on each exposure. At the present time these records are made successively on a strip of sensitized paper which, after development, provides a positive print record which can be compared with a previous record to determine the number of messages used by each subscriber during a particular billing period. The handling of two paper record strips of this type is found to involve difficulties which are time consuming and delay the preparation of information of the required accuracy for billing purposes.

In accordance with this invention the two records to be compared, which have been recorded on a photographic film developed as a positive, are each projected by individual optical systems to a common viewing screen with the image of one record partially superimposed on the image of the other record. The displacement between the images at the projection screen is equal at least to the height of the image of one row of registers of the five rows of registers recorded on a single exposure area of the film. At the projection screen there is provided a mask having an aperture therein extending the full width of the screen and having a height equal at least to twice the height of the image of one row of registers. The mask may, however, be provided with two separated apertures each having a height equal at least to the height of the image of one row of registers. This mask, therefore, permits but two images to reach the projection screen for viewing. Means are provided whereby this mask may be moved vertically across the projection screen to successively admit to the screen the images appearing in adjacent image areas at the screen.

The appearance of two superimposed images in the viewing image area of the screen defined by the apertures in the first mask is prevented by the provision of a second mask extending in a horizontal plane from a point midway between the optical projection systems to the center of the aperture, in the case of a single aperture, or midway of the two apertures, in the case of two separated apertures in the first mask. This second mask, in its center position, prevents the formation of images of either record in the image field of the other record. The end of this second mask disposed between the optical projection systems is pivoted. The opposite end of this second mask is pivotally attached to the first mask at the projection screen and moves with movement of the first mask. This second mask, at any position either side of its center position, prevents the formation of the image of one record in the image field of the other record.

For each position of the first or apertured mask along the plane of the projection screen, the aperture therein permits projection to the screen of images of only two rows of registers in juxtaposition and by reason of the position and manner of movement of the second mask, the rows of registers projected are corresponding rows from the two records.

The invention will be clearly understood from the specification when read in connection with the accompanying drawings, in which:

Fig. 1 is a side elevation of a projecting unit in accordance with this invention;

Fig. 2 is a plan view of the projecting unit shown in Fig. 1;

Fig. 3 is a front elevation of the projecting unit;

Fig. 4 is a diagrammatic showing of the superimposed light beams and masking means of the projecting system in accordance with this invention;

Fig. 5 is a section taken along line 5—5 of Fig. 1;

Fig. 6 is a section taken along line 6—6 of Fig. 1;

Fig. 7 is a section taken along line 7—7 of Fig. 1;

Figs. 10, 11 and 12 are disclosures of the superimposed light beams as projected to a viewing screen and the images projected for three distinct positions of the masking elements with respect to the screen.

Figure 9:
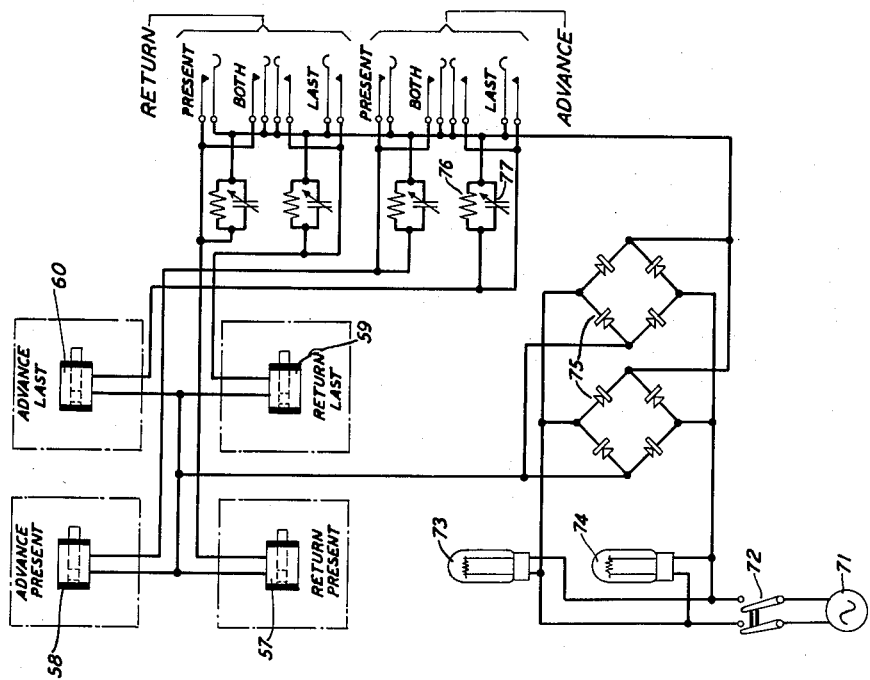
Fig. 9 is a schematic of the electrical circuit from a current source to the projector light sources, film advancing solenoids and pushbutton controls for the solenoids.

Referring to Fig. 1, numeral 1 indicates a base provided on its underside with pads of felt or rubber as indicated at 2. Base 1 is further provided with an upwardly extending flange 3 to which is secured a housing 4 by means of machine screws as indicated at 5. The rear portion of housing 4 is attached to the front portion thereof by a hinge 6. This rear hinged portion, which is provided with air vents 7, is movable upward about hinge 6 to permit access to the interior of the housing.

A supporting base 8, secured to base 1, provides a supporting means for a pair of vertically aligned optical projecting units 9 and 10 and a pair of film driving mechanisms mounted on unit support 11. These film driving units will be described in detail hereinafter.

Referring to Figs. 2 and 3, the front of housing 4 is provided with a translucent projection screen 13 which is secured to the housing by mounting strips 14. At the rear of screen 13 there is provided a mask 15 as shown in Fig. 6. This mask 15 is provided with two apertures 16 and 17, each of which extend the full width of the screen 13. As will be explained in greater detail hereinafter, the height of each of the apertures 16 and 17 is equal to the height of the image at the screen of an elemental area of the film record projected thereto or, in other words, to the height of the image of one horizontal row of message registers. It is within the scope of this invention, as is shown in Fig. 4, to provide one aperture in mask 15, this aperture having a height equal at least to twice the height of the image of an elemental area of the film record so that the two images projected on the screen may have their near edges abutting. In the application of the invention as shown herein, the images at the screen are separated by a distance equal to the height of the portion 19 on mask 15. This separation of the apertures is necessary in this particular application of the invention because in order to produce a sufficiently brilliant light beam the vertical dimension of the projecting systems 9 and 10 is such that they cannot be brought closer together vertically to permit superimposing the images at the screen with a displacement between the images equal only to the height of the image of one elemental area.

As shown in Fig. 6, the mask 15 may be moved along the screen to successively uncover the images of other corresponding elemental areas of the photographic records projected thereto. The mask 15 may be moved vertically by manual operation of a knob 20 which is secured to one end of a shaft 21 (Fig. 6) extending through slots 22 in housing 4. The other end of shaft 21 is anchored to mask 15. Channels 23 and 24 guide the mask 15 in its vertical movement and by means of notches 25 in channel 24 and projection 26 mounted in mask 15, this mask may be held in adjusted position against the upward pull of a pair of springs 27 and 28, each of which has its upper end secured to housing 4 and its lower end secured to mask 15.

Referring to Figs. 1 and 2, a mask 30 is provided within the housing 4. This mask extends from a point midway between the optical systems 9 and 10 to a point midway between apertures 16 and 17 in mask 15 (Fig. 6). Mask 30 is pivotally secured to mask 15. Near the end of mask 30 adjacent the optical systems, it is provided with a pivot hinge 31. The end 32 of mask 30 is U-shaped. This U-shaped end fits over and slides on an element 33 which extends outwardly from and is fixed to member 11. It will be seen that by this construction, one end of mask 30 is movable vertically about its pivot 31 with a vertical movement of mask 15.

Figure 8:
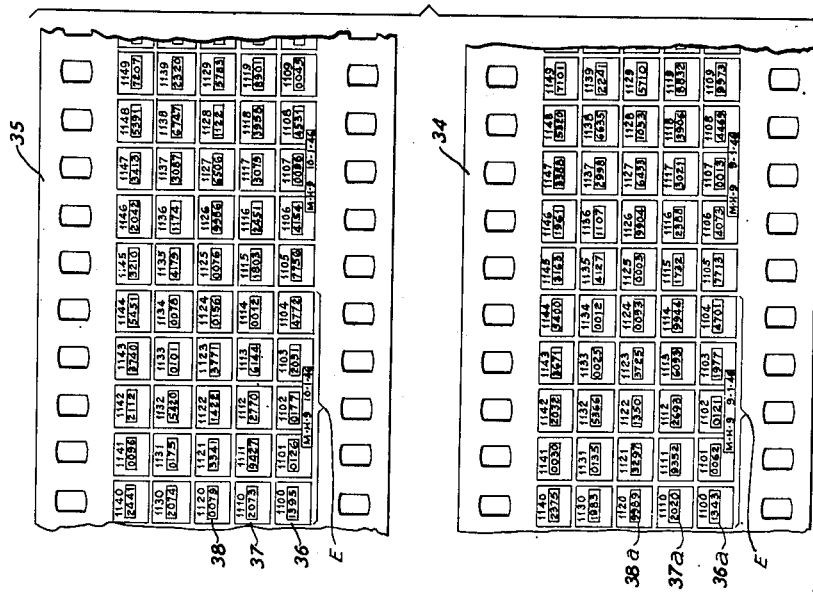
Fig. 8 shows an enlarged view of two film records of rows of message registers which are projected in the projection unit of Fig. 1.

The action of the masks 15 and 30 in the optical system discussed may be readily understood by reference to Figs. 4 and 8. Fig. 8 shows portions of two developed positive films of the same bank of registers taken at different times. Each of films 34 and 35 shows two successive exposures. It will be seen that a single exposure E on these films includes five horizontal rows of five registers. Each of these films is threaded in the projector of Fig. 1 and one exposure of five rows of five registers of the later recorded film 35 is projected by means of projecting system 9 to the screen 13. The corresponding exposure of five rows of five registers of the earlier recorded film 34 is projected by projecting system 10 to screen 13 partially superimposed on the image from film 35. The image of the record of film 34 is displaced downwardly from the image of film 35 a distance equal to the height of the image of one row of registers of the five rows projected from each of films 34 and 35.

As shown in Fig. 4, the image 36' of row 36 of film 35 is projected at the top of screen 13. The image 36'a of row 36a of film 34 is projected to the same image area as the image 37' of row 37 of film 35 and so on down the screen. The mask 15, in the position shown, permits two adjacent image areas to view on screen 13 and mask 30 prevents the formation on this screen of the image of row 37 and permits the formation of the image 36'a of row 36a below and in juxtaposition to image 36' of row 36. Movement of mask 15 vertically downward a distance equal to the height of one image area will permit projection to the screen of the images 37' and 37'a of the succeeding corresponding rows of registers 37 and 37a. Further similar downward movement of mask 15 will permit successive comparison of all corresponding rows of registers of the two film records.

Figs. 10, 11 and 12 show the optical system of the projector of Fig. 1 with the masks 15 and 30 shown in three of their possible five positions. In this application of this invention as mentioned hereinabove, the size of the optical elements is such that the center lines of the optical systems can be brought only close enough to partially superimpose the two images with a displacement equal to slightly more than twice the height of the image of one row of registers. The apertures 16 and 17 in mask 15 are, therefore, separated by the portion 19 of the mask 15. For the position of the masks shown in Fig. 12, the images 38' and 38'a of rows 38 and 38a appear on screen 13 as shown in Fig. 3. It is obvious from this disclosure of the optical projection system in accordance with this invention, that an operator may quickly and accurately compare the register numbers and readily obtain the figure representing the number of messages recorded for that particular subscriber's line.

In many register installations, the registers are mounted on equipment frames in rows having ten consecutively numbered registers to a horizontal row. The usual camera equipment provides for the recording in one exposure of five horizontal rows of only five registers so that, as shown in Fig. 8, the registers numbered, for example, from 1100 to 1104, inclusive, are on one frame or exposure, while those numbered from 1105 to 1109, inclusive, are on the succeeding frame or exposure.

There is provided a means for driving the two films 34 and 35 forward independently or simultaneously and for reversing these films independently or simultaneously. By means of the independent forward or reverse drives, each film can be displaced relative to the other to bring the corresponding exposures of the films in alignment with their respective optical projecting system. Also, by reason of the simultaneous forward and reverse movement of the two films, corresponding rows of the first exposure may be compared, the films advanced simultaneously to compare the same corresponding rows of the second exposure, the films reversed to the first exposure and the masking means moved to the next comparison position. This operation can be repeated to permit successive comparison of consecutively numbered registers.

The film guiding and driving mechanism is mounted on the supporting unit 11. Two film guiding channels 40 and 41 are mounted on supporting unit 11 to extend across the housing 4. These channels are aligned with openings on both sides of the housing, permitting the films to be inserted into the channels. Each channel is provided with an exposure aperture 42 (Fig. 7) permitting passage therethrough and through the film therein of the light beam from its associated optical system. An objective lens 43 is mounted on unit 11 in front of each aperture 42 to produce an image of the film record on screen 13.

An opening 44 (Fig. 5) is provided in one wall of each channel to permit engagement between the marginal perforations of the film and the teeth of a driving sprocket 45. Sprocket 45 is mounted on and rotated by a shaft 46 which is rotatable in bearings in supporting member 11. Shaft 46 is provided at its upper end with a ratchet 47 and at its lower end with a ratchet 48. The film 35 is inserted into channel 40 at one end and out the opposite end thereof. The shaft 46 and therefore sprocket 45 is free to rotate under the pull of the film 40 except only for a small friction placed on shaft 46 by notched wheel 49 and an associated spring-urged spherical surface 50 mounted in unit 11.

Similar elements are provided for driving film 34 in channel 41 in the form of sprocket 51 mounted on shaft 52. Ratchets 53 and 54 are mounted on opposite ends of shaft 52. A notched wheel 55 and an associated spring-urged spherical member 56 produces a light friction opposing free rotation of shaft 52.

The shaft 46 is rotated in one direction by a solenoid 57 and in a reverse direction by a solenoid 58. Similarly, shaft 52 is rotated in one direction by solenoid 59 and in a reverse direction by solenoid 60.

The solenoids are of the type generally shown in United States Patent 2,473,598, June 21, 1949 to G. H. Leland in which straight line movement of the solenoid plunger is translated into rotary motion of a shaft. This shaft is spring-urged to return to its initial position upon deenergization of the solenoid. The rotatable shaft of each solenoid is provided with a circular disc as indicated at 61 associated with solenoid 57. A pawl 62, pivotally mounted on disc 61, is disengaged from ratchet 47 when solenoid 57 is deenergized. Upon energization of this solenoid 57 the disc 61 is rotated to bring pawl 62 into engagement with ratchet 47 which, in turn, rotates shaft 46 and sprocket 45 in one direction. Energization of solenoid 58 produces rotation of a disc 63. Pawl 64 mounted on disc 63 engages ratchet 48 to move shaft 46 and sprocket 45 in the reverse direction. Thus, by energization of the proper solenoids, the film 35 may be driven forward or backward. Similarly, energization of solenoids 59 and 60 produces reverse and forward motion, respectively, of film 34. The rotation of each sprocket is such that the film engaged thereby is moved five perforations which, as shown in Fig. 8, will bring a new exposure or frame in front of the optical system.

Referring to Fig. 2, the forward surface of base 1 is provided with six push-buttons indicated at numeral 70. These push-buttons operate six switches as shown in Fig. 9 to advance or reverse each film individually or the two films simultaneously.

A source of alternating current supply 71 is connected through an on-off switch 72 to the projection lamps 73 and 74. From the lamps the current is passed through a rectifier, as indicated at 75, to the switches 72 and to solenoids 57, 58, 59 and 60.

The shunt resistor 76 and condenser 77 connected in parallel with each switch reduces to a minimum any sparking at the switch contacts to thereby greatly increase the operating life of the switch.

By means of the novel projection system provided in accordance with this invention, accurate comparison of a large number of message registers may be made by a single operator in a minimum of time. Further the likelihood of confusion as to corresponding rows of two records is eliminated by the projection to view of only the two rooms of interest, that is, corresponding rows from the two records.

While this invention is disclosed with particular application to the comparison of corresponding rows of message registers it can be employed with equal facility in the optical comparison of corresponding elemental areas of any two photographic records.

What is claimed is:

1. An optical comparator for comparing similar elemental areas of two photographic records comprising a screen, means for projecting an image of each of said records to said screen with the image of one record partially superimposed upon the image of the other of said records but vertically displaced with respect thereto a distance equal at least to the vertical dimension of the image of the area to be compared, a mask disposed at said screen having a pair of apertures therein, the combined vertical dimensions of both said apertures being equal at least to twice the height of the image of the area to be compared, and a second mask disposed in a horizontal plane between said screen and said image projecting means, said second mask having one end pivotally attached to said first mask midway of the apertures therein and its other end pivotally anchored at said image projecting means.

2. A system in accordance with claim 1 in which is provided a manually operable means for moving said first mask vertically across said screen to admit to view selected adjacent portions of the entire image field.

3. An optical comparator for comparing like elemental areas of two photographic records, comprising a viewing screen, a first optical system for projecting an image of one of said records onto said screen, a second optical system for projecting an image of the other of said records onto said screen superimposed upon but displaced with respect to the image of said first-mentioned record a distance equal at least to one dimension of the image of the elemental area to be compared, an opaque mask positioned at said screen and provided with an opening therein having a dimension in the direction of image displaced with respect to the image of said first-dimension in the direction of image displacement of the image of the elemental area to be compared, and a second opaque mask disposed in a plane normal to the plane of said screen, said second mask having one end thereof pivotally anchored at a point midway between said optical system and its other end pivotally anchored to said first mask midway of the opening therein.

4. A system in accordance with claim 3 in which means are provided for moving said first-mentioned opaque mask across said screen in the direction of image displacement.

5. An optical comparator for comparing corresponding elemental areas of two photographic records, comprising a viewing screen, optical means for projecting an image of both said records at said screen with the image of one of said records superimposed on the image of the other of said records but displaced in one direction with respect thereto, an opaque mask disposed at said screen, said mask having an aperture therein the dimension of which in the direction of image displacement is equal at least to twice the dimension in that direction of the image of the elemental area to be compared, means for moving said mask across said screen in the direction of image displacement and a second opaque mask disposed in a plane normal to the plane of said screen and extending from said optical means to said first-mentioned mask midway of the aperture therein whereby projection to said screen of any portion of the image-forming light beams from either record which would produce a double image in the viewed area thereof is prevented.

6. A system in accordance with claim 5 wherein one end of said second mask is pivotally anchored midway of said optical means and the other end thereof is pivotally attached to said first mask whereby said second mask is movable about its anchored end with movement of said first mask across said screen.

7. An optical comparator for comparing corresponding elemental areas of two photographic records, comprising a viewing screen, optical means for projecting an image of both of said records at said screen with the image of one of said records partially superimposed on the image of the other of said records but displaced in one direction with respect thereto, a first light obscuring means disposed in said optical projecting means to limit the visible image at said screen to a dimension in the direction of image displacement equal at least to twice the dimension in that direction of the image of the elemental area to be compared, a second light obscuring means associated with said optical projection means and disposed in a manner to obstruct the formation of an image in the visible image area at said screen which would produce superimposed images in the overlapping image field of said two records.

8. A system in accordance with claim 7 in which is provided means for adjusting said first light obscuring means in the direction of image displacement to successively admit to view selected adjacent areas of the entire image field at said screen.

JOHN H. WADDELL.

REFERENCES CITED

The following references are of record in the file of this patent:

UNITED STATES PATENTS

| Number | Name | Date |
| --- | --- | --- |
| 595,541 | Hollen | Dec. 14, 1897 |
| 1,424,556 | Cooke | Aug. 1, 1922 |
| 1,869,275 | Planer | July 26, 1932 |
| 1,940,004 | Mayhugh | Dec. 19, 1933 |
| 1,945,926 | Tolhurst | Feb. 6, 1934 |
| 1,951,707 | Preddey | Mar. 20, 1934 |
| 2,155,248 | Adams et al. | Apr. 18, 1939 |
| 2,357,593 | Leavell | Sept. 5, 1944 |
| 2,439,987 | Roger | Apr. 20, 1948 |
| 2,482,480 | Haracz | Sept. 20, 1949 |
| 2,496,272 | Current | Feb. 7, 1950 |